(12) United States Patent
Imamura et al.

(10) Patent No.: US 9,377,575 B2
(45) Date of Patent: Jun. 28, 2016

(54) LIGHT GUIDE PLATE, PLANAR LIGHT APPARATUS, AND DISPLAY DEVICE

(71) Applicant: SAMSUNG ELECTRONICS CO., LTD., Suwon-si (KR)

(72) Inventors: Hideki Imamura, Yokohama (JP); Atsuki Ueda, Yokohama (JP); Reina Iwasaki, Yokohama (JP); Yoshihiro Yokote, Yokohama (JP)

(73) Assignee: SAMSUNG ELECTRONICS CO., LTD. (KR)

( * ) Notice: Subject to any disclaimer, the term of this patent is extended or adjusted under 35 U.S.C. 154(b) by 167 days.

(21) Appl. No.: 14/056,572

(22) Filed: Oct. 17, 2013

(65) Prior Publication Data
US 2014/0104542 A1  Apr. 17, 2014

(30) Foreign Application Priority Data

Oct. 17, 2012  (JP) ................................. 2012-229531
Oct. 2, 2013  (KR) ........................ 10-2013-0117936

(51) Int. Cl.
*G02F 1/1335* (2006.01)
*F21V 8/00* (2006.01)
*G02B 6/27* (2006.01)

(52) U.S. Cl.
CPC ............ *G02B 6/0056* (2013.01); *G02B 6/0011* (2013.01); *G02B 6/274* (2013.01)

(58) Field of Classification Search
CPC .... G02B 6/0056; G02B 6/0011; G02B 6/274; G02B 6/0036; G02B 6/0055; G02B 6/0063; G02B 6/0051; G02B 6/0031; G02B 5/3008; G02B 5/0247; G02B 5/021

USPC .......................................................... 349/65
See application file for complete search history.

(56) References Cited

U.S. PATENT DOCUMENTS

| 5,825,543 | A | * | 10/1998 | Ouderkirk | ............ | G02B 5/3008 |
| | | | | | | 252/585 |
| 6,208,466 | B1 | | 3/2001 | Liu et al. | | |
| 7,315,671 | B2 | | 1/2008 | Huck et al. | | |
| 7,322,731 | B2 | | 1/2008 | Epstein et al. | | |
| 7,356,229 | B2 | | 4/2008 | Ouderkirk et al. | | |
| 7,526,164 | B2 | | 4/2009 | Ouderkirk et al. | | |
| 7,667,788 | B2 | | 2/2010 | Lee et al. | | |
| 7,777,833 | B2 | | 8/2010 | Hwang et al. | | |
| 7,784,954 | B1 | * | 8/2010 | Coleman | .......................... | 362/19 |

(Continued)

FOREIGN PATENT DOCUMENTS

| EP | 1273959 | 9/2006 |
| EP | 1258749 | 10/2006 |

(Continued)

*Primary Examiner* — Edward Glick
*Assistant Examiner* — David Chung
(74) *Attorney, Agent, or Firm* — Cantor Colburn LLP (57) ABSTRACT

The present invention provides a light guide plate for emitting light radiated from a light source disposed at a side of the light guide plate. The light guide layer has a light incidence side for internally introducing light emitted from the light source at the side thereof; a polarization separation layer comprising a first matrix layer and a first fiber having birefringence and disposed more toward the light emission side than the light guide layer; a low refractive index layer having a lower refractive index than the refractive index of the first matrix layer; and an angle improvement layer comprising a second matrix layer having a second fiber disposed inside the second matrix layer.

7 Claims, 8 Drawing Sheets

(56) References Cited

U.S. PATENT DOCUMENTS

| | | |
|---|---|---|
| 7,903,194 B2 | 3/2011 | Epstein et al. |
| 8,023,065 B2 | 9/2011 | Epstein et al. |
| 2006/0139948 A1 | 6/2006 | Huck et al. |
| 2006/0290842 A1 | 12/2006 | Epstein et al. |
| 2006/0290844 A1 | 12/2006 | Epstein et al. |
| 2006/0291238 A1 | 12/2006 | Epstein et al. |
| 2007/0047259 A1 | 3/2007 | Lee et al. |
| 2008/0101087 A1 | 5/2008 | Hwang et al. |
| 2008/0165419 A1 | 7/2008 | Ouderkirk et al. |
| 2011/0273907 A1* | 11/2011 | Iwasaki .................. 362/607 |
| 2012/0327332 A1 | 12/2012 | Yagi et al. |

FOREIGN PATENT DOCUMENTS

| | | |
|---|---|---|
| JP | 06-181787 | 7/1994 |
| JP | 10-125121 | 5/1998 |
| JP | 11-502036 | 2/1999 |
| JP | 2002-530713 | 9/2002 |
| JP | 2003-200059 | 7/2003 |
| JP | 2006-517720 | 7/2006 |
| JP | 2007-066888 | 3/2007 |
| JP | 2008-108704 | 5/2008 |
| JP | 2008-532088 | 8/2008 |
| JP | 2009-047802 | 3/2009 |
| JP | 2012-242755 | 12/2012 |
| JP | 2013-007901 | 1/2013 |

* cited by examiner

(A) S polarization (B) P polarization

| Material | Abbreviation | Size(μm) | Measured Value (at 589nm) | | |
|---|---|---|---|---|---|
| | | | no | ne | Δn |
| polyethyleneterephthalate | PET | 22 | 1.5301 | 1.7047 | 0.1746 |
| Polyethylenenaphthalate | PEN | 19 | 1.5568 | 1.9136 | 0.3568 |
| Nylon 6.10 | N610 | 26 | 1.5164 | 1.5666 | 0.0502 |

FIG. 6

| Example | Example 1 | Example 2 | Example 3 | Comparative Example 1 | Comparative Example 2 |
|---|---|---|---|---|---|
| Angle Performance-enhancing Layer | PET | PEN | Nylon 6,10 | - | Prism Film |
| Front Brightness (cd/m2) | 1955 | 1853 | 1989 | 1809 | 1733 |
| Light-Emitting Angle Distribution of S polarization Components (Peak Angle) | α2 -=14° | α2 -=15° | α2 -=40° | α1 -=47° | (14°) |

FIG. 7

LIGHT GUIDE PLATE, PLANAR LIGHT APPARATUS, AND DISPLAY DEVICE

CROSS-REFERENCE TO RELATED APPLICATION

This application claims priority to Japan Patent Application No. 2012-229531 filed in the Japan Intellectual Property Office on Oct. 17, 2012 and Korean Patent Application No. 10-2013-0117936 filed in the Korean Intellectual Property Office on Oct. 2, 2013, and all the benefits accruing therefrom under 35 U.S.C. §119, the contents of which in their entirety are herein incorporated by reference.

BACKGROUND

1. Field

A technique to control a direction of light emitted from a light guide plate is disclosed.

2. Description of the Related Art

A liquid crystal display (LCD) displays an image by transmitting or blocking light emitted from a planar light apparatus such as a backlight and the like using a polarizer and liquid crystal.

The polarizer used in the liquid crystal display (LCD) is generally manufactured by using a polyvinyl alcohol (PVA) film colored with iodine and stretched in one axis direction, and attaching a triacetyl cellulose (TAC) film as a protection film to one side or both sides of the polyvinyl alcohol (PVA) film. In addition, the TAC film may be replaced with an absorption-type polarizer manufactured by disposing a coating layer such as an acrylic resin and the like on one side of a polarizer or attaching a phase difference film such as norbornene, polycarbonate, or the like thereto.

However, this absorption-type polarizer has a characteristic of transmitting light in its transmission axis direction but absorbing the other light components, and thus may not theoretically exceed light utilization efficiency of about 50% and may just reach a maximum of about 48% considering a reflection rate on the internal surface thereof of 4%. Accordingly, effective utilization of light emitted from the backlight and the consequent luminance improvement of the backlight are desirable of the liquid crystal display (LCD). These may be obtained by using a reflective polarizer having optical reflection interference characteristics.

The reflective polarizer reflects light of a particular polarization but transmits light of the opposite polarization and is used as follows.

The reflective polarizer is disposed in the same axis as the absorption-type polarizer, so that the light transmitting from the reflective polarizer may pass through the absorption-type polarizer in linear polarization.

Accordingly, the absorption-type polarizer may improve the utilization efficiency of light emitted from the backlight by reflecting polarized light absorbed in the absorption-type polarizer with the reflective polarizer and then turning the polarized light back to the backlight and reusing the polarized light.

The reflective polarizer may be a brightness enhancement film, for example, DBEF (registered trademark) made by Sumitomo 3M Ltd. This brightness enhancement film is formed of hundreds of stacked polymer films by controlling a precise process to secure polarization characteristics over a wide visible light region as a result of which it is expensive.

Accordingly, Japanese Patent Laid-open No. 11-502036 discloses a reflective polarizer using a polarization sensitive scattering element (PSSE) as a method of decreasing the manufacturing cost. Japanese Patent Laid-open No. 11-502036 realizes polarization separation by transmitting light of one particular polarization while at the same time scattering light of other polarizations. The reflective polarizer detailed by Japanese Patent Laid-open No. 11-502036 does not display sufficient polarization separation efficiency and in addition does not display much high light utilization efficiency, since undesirable polarized light is scattered and transmitted forward.

In addition, Japanese Patent Laid-open No. 2006-517720 realizes polarization separation by using a fiber having birefringence as the polarization sensitive scattering element (PSSE) and integrating the fiber with a light guide plate having an isotropic refractive index. Japanese Patent Laid-open No. 2006-517720 realizes polarization separation by scattering light of one particular polarization in a layer formed of the fiber that displays birefringence. The polarized light is emitted externally. In addition, Japanese Patent Laid-open No. 2006-517720 barely increases utilization efficiency of light, since a part of the scattered light and the other polarized light (in the layer formed of the fiber having birefringence and the matrix) is emitted through the light guide plate (LGP) and subsequently becomes extinct. In addition, the direction of the scattered and emitted light is reported to be determined by the shape of the fiber, but since externally emitted light is actually divided into two directions, the emitted polarized light may not be efficiently used.

SUMMARY

Accordingly, a light guide plate using the fiber with birefringence and the matrix is used to efficiently emit light from a light source.

According to one embodiment, a light guide plate emitting light radiated from a light source disposed at a side thereof through a light emission side, the light guide plate comprising a light guide layer having a light incidence side for introducing light emitted from the light source into the light guide layer; a polarization separation layer comprising a first matrix layer having an isotropic refractive index of nm1 and a first fiber having birefringence, with an ordinary ray refractive index, no1 and an extraordinary ray refractive index, ne1; where the extraordinary ray refractive index is measured parallel to the length direction of the fiber and the ordinary ray refractive index is measured perpendicular to the length direction of the fiber; where the polarization separation layer are disposed in the polarization separation layer closer to the light emission side than the light guide layer; a low refractive index layer having a lower refractive index than the refractive index of the first matrix layer and disposed more toward the light emission side than the polarization separation layer; and an angle improvement layer comprising a second matrix layer having an isotropic refractive index of nm2 and a second fiber disposed inside the second matrix layer and having birefringence, with an ordinary ray refractive index, no2, an extraordinary ray refractive index ne2, where the extraordinary ray refractive index is measured parallel to the length direction of the fiber and the ordinary ray refractive index is measured perpendicular to the length direction of the fiber; and where the angle improvement layer is disposed more toward the light emission side than the low refractive index layer, wherein the first matrix layer, the second matrix layer, the first fiber, and the second fiber have a refractive index in a range of $|nm1-no1|\leq 0.01$ and $|nm2-no2|\leq 0.01$, or $|nm1-ne1|\leq 0.01$ and $|nm2-ne2|\leq 0.01$.

The light guide plate may efficiently emit light from a light source.

The low refractive index layer may be a gas layer. The light guide plate may efficiently emit light from a light source.

The first and second matrix layers include a resin having the same composition, and the first and second fibers may include a resin having the same composition. The light guide plate may be manufactured with a lower cost.

The second fiber may be disposed substantially in the same major-axis direction as the major-axis direction of the first fiber. According to the light guide plate, light is emitted perpendicularly with the light emission side of the light guide layer.

A reflector rotating light polarization and reflecting light may be mounted on at least one side of neither the light incidence side of the light guide layer nor the light emission side. Accordingly, the light guide plate may efficiently emit light from the light source.

The first fiber may have a changing disposition density depending on a distance from the light incidence side, and the second fiber may have a disposition density having an inverse relationship with the disposition density of the first fiber. The light guide plate may decrease in-plane non-uniformity of intensity of emitted light.

According to another embodiment, a planar light apparatus having the light guide plate and a light source mounted at the side of the light guide plate is provided. The planar light apparatus may decrease power consumption during light emission.

According to another embodiment, a display device is provided, including: the above planar light apparatus; a liquid crystal panel through which light emitted from the light emission side enters and which controls rotation of polarization direction of the light; and a polarizer mounted at the opposite side of the planar light apparatus with a reference to the liquid crystal panel.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a planar light apparatus according to one embodiment is described referring to drawings. The following embodiments are exemplary embodiments of the present disclosure, but the present disclosure is not limited thereto.

In addition, a dimension ratio in the drawings is used for better understanding and easy description, and may be different from an actual ratio.

<First Embodiment>

Hereinafter, a planar light apparatus according to a first embodiment is described referring to the drawing.

Figure 1:
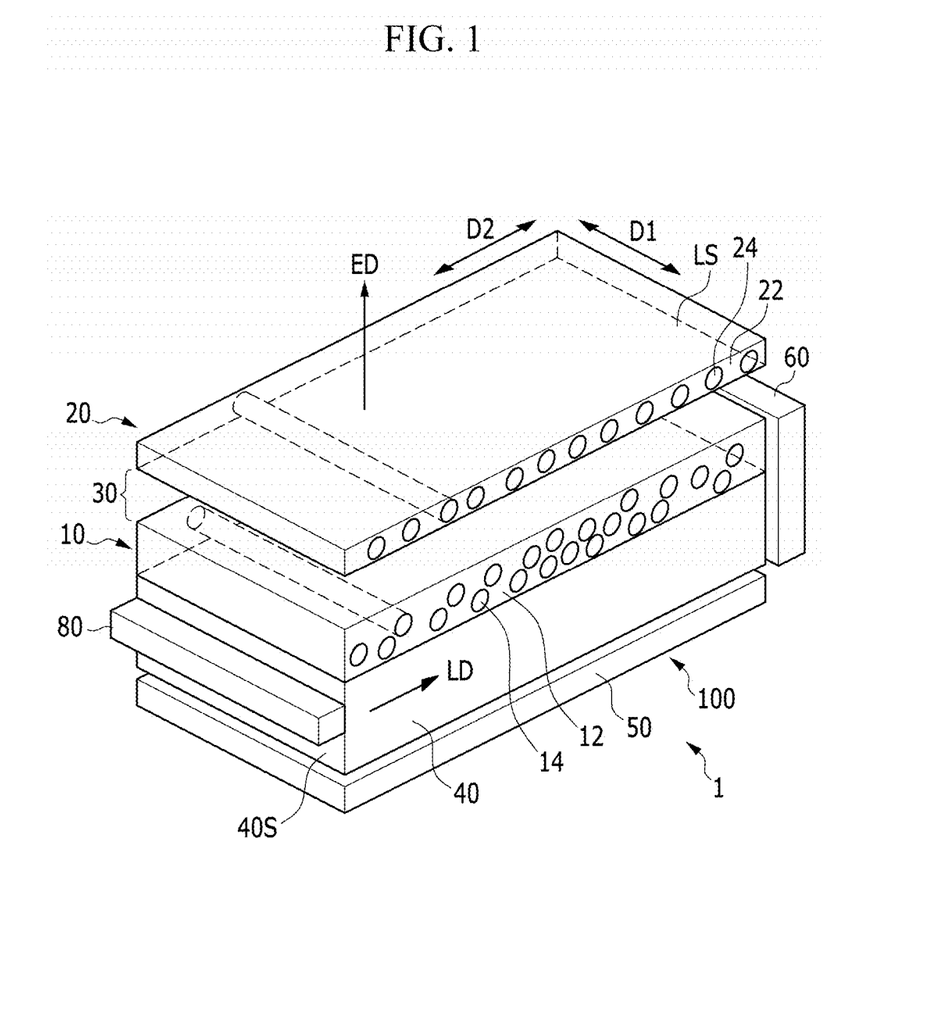
FIG. 1 is a schematic view showing the structure of a planar light apparatus according to a first embodiment.

FIG. 1 is a schematic view showing the structure of a planar light apparatus according to the first embodiment.

Referring to FIG. 1, a planar light apparatus 1 may be an edge light-type backlight unit that may be used for a liquid crystal display (LCD) and the like. The planar light apparatus 1 may include a light guide plate 100 and a light source 80. For example, the light source 80 may be an LED (a light emitting diode) or a CCFL (a cold cathode fluorescent lamp), but is not limited thereto.

Light (LD) emanating from the light source 80 enters from the light incidence side 40S of the light guide plate 100 and is emitted through the light emission side (LS) thereof. The light emitted through the light emission side (LS) may be, for example, emitted in a direction perpendicular to the light emission side (LS) (hereinafter referred to be an ED direction).

The light guide plate 100 includes a polarization separation layer 10, an angle improvement layer 20, an air layer 30, a light guide layer 40, a lower reflector 50, and a side reflector 60.

The light guide layer 40 may be formed of a material that is optically transparent and that can transmit incident light (in the visible portion of the electromagnetic spectrum) from the light source 80. It is desirable for the optically transparent material to be a polymeric material. In one embodiment, the optically transparent material is polymethyl methacrylate (PMMA), polystyrene (PS) or polycarbonate (PC). The incident light from the light source 80 is introduced into the light guide layer 40 from the light incidence side 40S.

The polarization separation layer 10 is stacked at the light emission side (LS) of the light guide layer 40, and has a first matrix layer 12 and a plurality of first fibers 14 disposed inside the first matrix layer 12.

The first fibers 14 may be disposed by setting their length direction along a direction D1. Herein, the direction D1 indicates a direction perpendicular to both of the light incidence side 40S (hereinafter referred to be a direction D2) and the ED direction as shown in FIG. 1.

According to the first embodiment, the first fiber 14 has low, high, and low disposition (e.g., distribution) densities in sequential order from a near position with reference to the light source 80. In other words, the first fiber 14 may be disposed to have high density in the middle of the direction D2 but low density at both ends of the polarization separation layer 10. In this way, when light is emitted from the polarization separation layer 10 into the air layer 30, the in-plane distribution of light may approach a fairly uniform distribution.

On the other hand, the disposition density of the first fiber 14 may be changed continuously or in stages. In one embodiment, the disposition density of the first fiber 14 may not change in the direction D2. In another embodiment, the disposition density of the first fiber 14 may change smoothly along the direction D2.

FIG. 1 schematically shows a disposition density of the first fiber 14 in the polarization separation layer 10, but does not necessarily reflect an actual density. This is the same as the post-described second fiber 24.

The first fiber 14 may be an stretched resin (i.e., it is subjected to elongational forces during manufacturing, which impart to it different refractive indices in different directions). Accordingly, the first fiber 14 may have birefringence such that the refractive index in the length direction (the direction D1) (hereinafter referred to be an extraordinary ray refractive index ne1) is different from the refractive index of a cross-section direction (a direction perpendicular to the direction D1) (hereinafter referred to be an ordinary ray refractive index no1).

Figure 5:
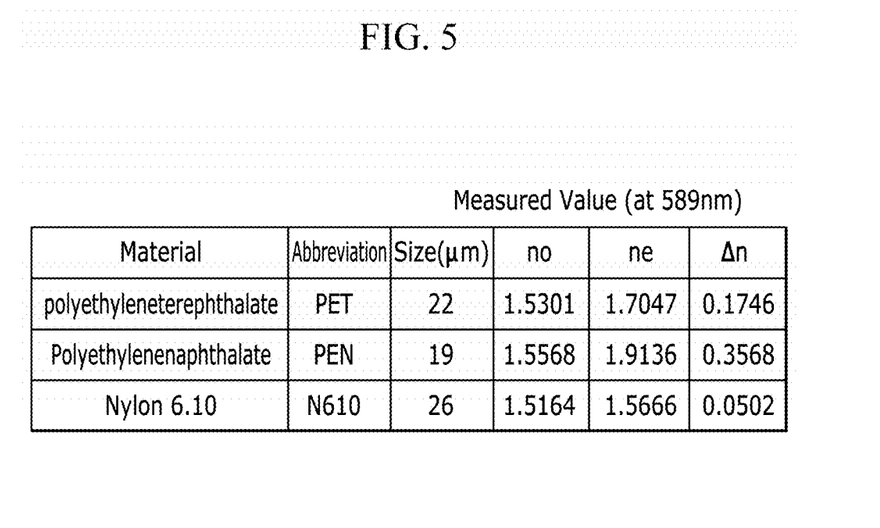
FIG. 5 shows optical properties of a fiber used in each example.

Specifically, the ordinary ray refractive index no1 is smaller than the extraordinary ray refractive index ne1, and for example, when the first fiber is polyethylene terephthalate (PET) in the post-mentioned embodiment, no1=1.5301, ne1=1.7047, and Δn=ne1-no1=0.1746 (refer to FIG. 5).

The first fiber 14 may include various materials having birefringence, and for example, may include a polymer fiber prepared by stretching a polymer. Herein, the cross-section of the first fiber 14 may have excellent stability and durability, and the orientation of the first fiber 14 is easy to control.

Specific materials used to produce the polymer fiber may be, for example, a polyolefin-based fiber such as polyethylene (PE), polytetrafluoroethylene (PTFE), polypropylene (PP), and the like; a polyvinyl-based fiber such as polyvinylidene fluoride (PVdF), polyvinyl fluoride (PVF), polyvinyl chloride (PVC), polyvinyl alcohol (PVA), and the like; an acryl-based fiber such as polyacrylonitrile (PAN) and the like; an aliphatic polyamide-based fiber such as nylon 6 (N6), nylon 6,6 (N66), nylon 4,6 (N46), nylon 6,10 (N610), and the like; an aromatic polyamide-based fiber (aramid fiber) such as poly(m-phenylene isophthalamide) (PMPIA), poly(p-phenylene terephthalamide) (PMPTA), and the like; a polyester-based fiber such as polyethylene terephthalate (PET), polyethylene naphthalate (PEN), poly-ε-caprolactone, and the like; an animal fiber such as silk, wool, spider web, and the like; a cellulose-based vegetable fiber such as cupra, rayon-based fiber and the like, but are not limited thereto.

For example, the polymer fiber may have a difference in refractive index between a direction parallel to D1 and another direction perpendicular to D1 (Δn) of greater than or equal to about 0.03, greater than or equal to about 0.1, or greater than or equal to about 0.15, but it is not limited thereto. In this case, the polymer fiber may further improve light diffusion efficiency of the polarization separation layer 10.

The ordinary ray refractive index no1 and extraordinary ray refractive index ne1 of the polymer fiber may be controlled by adjusting an extension rate or ratio when the polymer is stretched (i.e., subjected to elongation), a material of the polymer, and thickness (diameter) and density of the fiber.

The first matrix layer 12 transmits light emitted from the light source 80, and may be formed of an optically isotropic material. In addition, the first matrix layer 12 may have properties that enable a close contact with the first fiber 14 to maintain and/or support the first fiber 14 therein.

For example, the first matrix layer 12 may include a curable resin polymerized and/or cross-linked by heat or radiation. For example, a UV curable resin including a compound having an acryloyl group, a methacryloyl group, a vinyl group, an allyl group, a styryl group, a thiol group, an epoxy group, a vinylether group, an oxetanyl group, and the like, a thermosetting resin such as a silicone resin, an allyl ester, an acryl-based resin, an epoxy resin, a polyimide, a urethane-based resin, or the like, or a combination thereof may be used without limitation. These resins may be used as a mixture of two or more.

Another example may be an acrylic resin such as polymethylmethacrylate (PMMA) and the like, a polyolefin resin such as polyethylene (PE), polypropylene (PP), a cycloolefin polymer (COP), and the like, a polyester resin such as polyethylene terephthalate (PET), polybutylene terephthalate (PBT) and the like, a polyether such as polyphenylene oxide (PPO) and the like, a vinyl resin such as polyvinyl alcohol (PVA) and the like, polystyrene, polycarbonate, polyurethane, polyamide, polyimide, an epoxy resin, a copolymer including two or more monomers from the list of the aforementioned polymers, or a blend of the aforementioned polymers, but is not limited thereto. For example, the first matrix layer 12 may have a desired refractive index nm1 by mixing a plurality of resins.

The refractive index nm1 of the first matrix layer 12 and the ordinary ray refractive index no1 of the first fiber 14 may have a difference (hereinafter an absolute value of the difference unless particularly mentioned) controlled to be less than or equal to a predetermined value. Hereinafter, when the difference is controlled to be less than or equal to the predetermined value, it is referred to as "refractive index conformation".

The refractive index nm1 of the first matrix layer 12 may or may not conform with the refractive index of the light guide layer 40.

For example, the predetermined value may be about 0.02 (i.e., |nm1-no1|≤0.02), about 0.01 (i.e., |nm1-no1|≤0.01), and about 0.003 (i.e., |nm1-no1|≤0.003), but is not limited thereto. When the predetermined value is in the range, sufficient polarization separation may be realized by decreasing the increasing rate of a P polarization component drawn out into the air layer 30 down to less than or equal to about 20% and specifically, less than or equal to about 10%. On the other hand, the increasing rate is measured with reference to the amount of the P polarization component drawn into the air layer 30 when nm1=no1.

Figure 2:
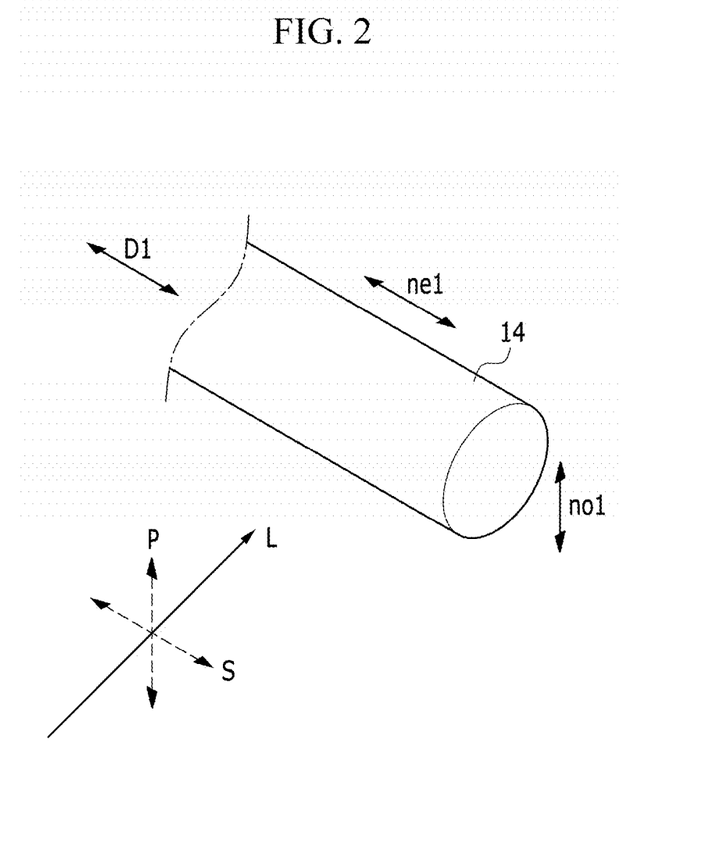
FIG. 2 shows a relationship among the ordinary ray refractive index no1 and the extraordinary ray refractive index net of the first fiber and incident light according to the first embodiment.

FIG. 2 is a drawing showing a relationship among the ordinary ray refractive index no1 and the extraordinary ray refractive index ne1 of the first fiber 14, and incident light (L), according to the first embodiment.

Referring to FIG. 2, S polarization of the incident light (L) (vibration in a vertical side with an incident side) receives the optical influence of the extraordinary ray refractive index (ne), while P polarization (vibration in the incident side) receives the optical influence of the ordinary ray refractive index no1 in the first fiber 14.

Figure 3:
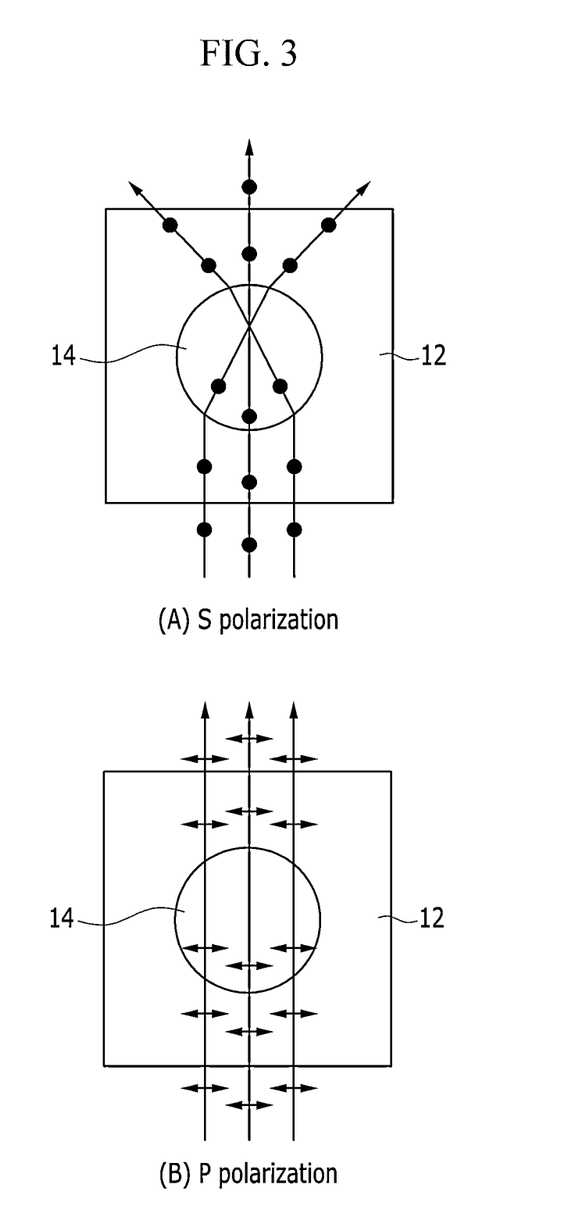
FIG. 3 shows refraction of S and P polarizations in a first fiber according to the first embodiment.

FIG. 3 shows refraction of the S and P polarizations in the first fiber according to the first embodiment. FIG. 3 shows the polarization separation layer 10 viewed along the direction D1 in FIG. 2.

The black dots in FIG. 3 (a) show the S polarization vibrating in a plane perpendicular to the ground (the direction D1), and the arrows in FIG. 3 (b) show the P polarization vibrating in a plane parallel to the ground.

As described above, the S polarized light may have the optical influence of the extraordinary ray refractive index ne1 of the first fiber 14. Since the refractive index nm1 of the first matrix layer 12 does not conform to the extraordinary ray refractive of the index ne1 of the first fiber 14, the S polarized light out of the incident light emitted from the first matrix layer 12 into the first fiber 14 may be refracted as shown in FIG. 3 (a).

On the other hand, the P polarized light may have the optical influence of the ordinary ray refractive index no1 of the first fiber 14. Since the refractive index nm1 of the first matrix layer 12 conforms with the ordinary ray refractive index no1 of the first fiber 14, the P polarized light out of the incident light emitted from the first matrix layer 12 into the first fiber 14 may generally go straight as shown in FIG. 3 (b).

In this way, the S polarization component out of the incident light emitted from the light guide layer 40 into the polarization separation layer 10 will be scattered, but the P polarization component will go straight.

The air layer 30 may have a refractive index na of about 1, which is smaller than the refractive index of the matrix layer 12 and the first fiber 14. Accordingly, a part of the refracted and scattered S polarized light is emitted from the polarization separation layer 10 into the air layer 30, and most of the other light may be totally internally reflected on the interface of the polarization separation layer 10 and the air layer 30.

As a result, the S polarization component out of the light emitted from the light source 80 is separated and emitted into the air layer 30.

Referring to FIG. 1, the separation of the S polarization component is illustrated.

The angle improvement layer 20 is stacked at the light emission side (LS) of the polarization separation layer 10 with the air layer 30 therebetween, and includes a second matrix layer 22 and a plurality of second fibers 24 disposed inside the second matrix layer 22.

The second fibers 24 may be disposed in their length direction along the direction D1. For example, the second fibers 24 may be disposed to have the same disposition density regardless of a distance from the light source 80.

The end of the angle improvement layer 20 is supported by a frame at a distance from the polarization separation layer 10, and thus the air layer 30 may be formed.

The second fiber 24 may be an stretched resin like the first fiber 14, and may have birefringence such that the refractive index of the second fiber 24 in a length direction (hereinafter referred to as an extraordinary ray refractive index ne2) is different from the refractive index of the cross-section of the second fiber 24 (hereinafter referred to as an ordinary ray refractive index no2). Specifically, the ordinary ray refractive index no2 may be smaller than the extraordinary ray refractive index ne2.

The second fiber 24 may include various materials having birefringence like the first fiber 14. The second fiber 24 may be, for example, a polymer fiber prepared by stretching a polymer. Herein, the cross-section of the second fiber 24 has excellent stability and durability, and the orientation of the second fiber 24 is easy to control.

For example, the second fiber 24 may have Δn of greater than or equal to about 0.03, greater than or equal to about 0.1, or greater than or equal to about 0.15, but is not limited thereto. When the second fiber 24 has Δn within the range, the light diffusion efficiency of the angle improvement layer 20 may be easily improved.

Specifically, examples of the polymer fiber are similar to the examples of the first fiber 14 detailed above and will be omitted in detail here.

The second matrix layer 22 transmits light from the light source 80 like the first matrix layer 12, and may be formed of an optically isotropic material. In addition, the second matrix layer 22 may be capable of closely contacting the second fiber 24 to maintain and/or support the second fiber 24 therein.

Specific examples of the curable resin are overlapped with examples of the first matrix layer 12, and thus will be omitted here.

For example, the angle improvement layer 20 may have the same composition as that of the polarization separation layer 10. In other words, the first matrix layer 12 and the second matrix layer 22 are formed of a resin having the same composition, and the first fiber 14 and the second fiber 24 may be formed of a resin having the same composition.

As for the angle improvement layer 20, like the polarization separation layer 10, the refractive index nm2 of the second matrix layer 22 may conform (i.e, be almost equal) to the ordinary ray refractive index no2 of the second fiber 24.

The refractive index may be set, for example, at |nm2-no2|≤0.02 like that of the polarization separation layer 10, |nm2-no2|≤0.01 out of the range, and specifically, |nm1-no1|≤0.003, but is not limited thereto.

The S polarized light drawn out from the light guide layer 40 through the polarization separation layer 10 may enter the angle improvement layer 20. The S polarized light entering the angle improvement layer 20 may be refracted on the interface of the second matrix layer 22 and the second fiber 24.

In this way, the S polarized light from the side of the air layer 30 is refracted and/or scattered in the angle improvement layer 20 and drawn out from the light emission side (LS). Accordingly, the width (area) of the S polarized light becomes larger by the angle improvement layer 20 when drawn out from the polarization separation layer 10 into the air layer 30.

In this way, the angle improvement layer 20 widens the emitted light and enlarges an angle, and thus separates S and P polarizations. Accordingly, the angle improvement layer 20 may be thinner than the polarization separation layer 10, but it is not limited thereto, and may be thicker than the polarization separation layer 10 if desired.

A lower reflector 50 may be disposed at the bottom of the light guide layer 40, and along the sides of the light guide layer 40 to reflect light leaked out of the light guide layer 40. A side reflector 60 may be disposed on the side of the layers 40 and 10 facing the light incidence side 40S. The reflecting side is positioned at the side of the light guide layer 40 to reflect light leaked out of the light guide layer 40.

The lower and side reflectors 50 and 60 may reflect light that is lost from the light guide layer 40 back to the light guide layer 40, thus preventing a loss of light.

On the other hand, the side reflector 60 may be mounted at a side other than at the side facing the light incidence side 40S and also at an area other than the light source 80 at the light incidence side 40S. In addition, a phase difference plate may be positioned between the lower or side reflector 50 or 60 and the light guide layer 40. For example, the phase difference plate may be a λ/4 plate causing a phase difference of λ/4.

Figure 4:
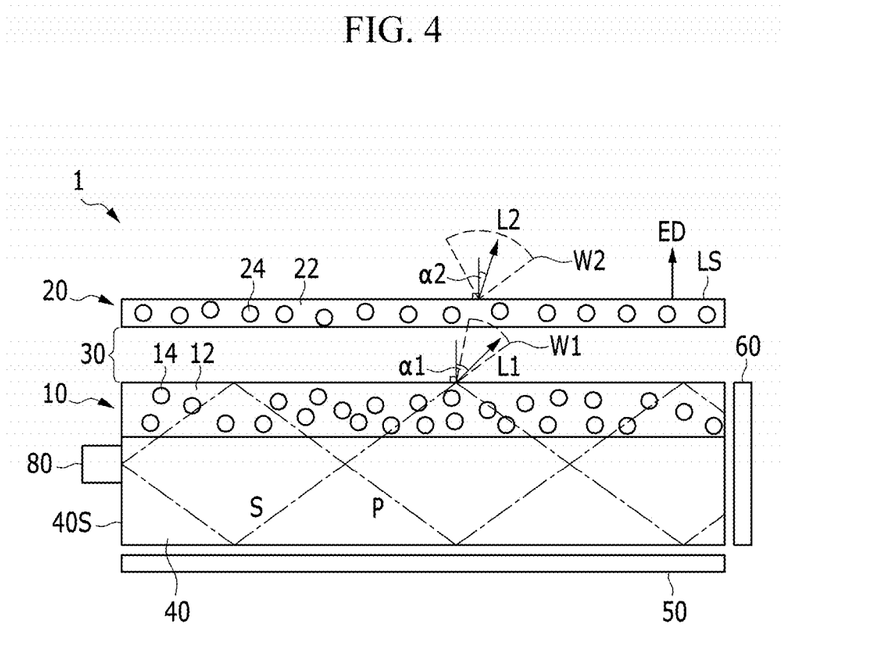
FIG. 4 shows light-emitting directions of the S and P polarizations according to the first embodiment.

Details will now be provided as to how light from the light source 80 is drawn out of the light emission side (LS) in the planar light apparatus 1 is illustrated referring to FIG. 4.

FIG. 4 shows light-emitting directions of the S and P polarizations according to the first embodiment.

FIG. 4 shows the planar light apparatus 1 in FIG. 1 viewed from the direction D1. FIG. 4 schematically shows the S polarized light with a one-dot line and the P polarized light with a two-dot line out of light from the light source 80.

The P polarized light may hardly be refracted or scattered by the first fiber 14 in the polarization separation layer 10 and thus goes straight.

When light enters from the polarization separation layer 10 into the air layer 30, a part of the light may be drawn out into the air layer 30 depending on an incident angle, but most of the light is totally reflected on the interface of the polarization separation layer 10 and the air layer 30. The P polarized light decreases through repeated reflections but is partly rotated into the S polarization.

On the other hand, when the S polarized light is refracted and scattered in the polarization separation layer 10 and enters the air layer 30 from the polarization separation layer 10, the light having a smaller incident angle may be drawn out into the air layer 30. Herein, the light rotating from the P polarization to the S polarization and the S polarized light not drawn out by the total reflection are refracted and scattered again in the polarization separation layer 10 and is drawn out into the air layer 30. As a result, separation efficiency of polarization may be improved.

Since incident light has various angles in the polarization separation layer 10, drawn-out light (emitted light) may have a predetermined distribution.

In FIG. 4, a fan-shape (an arc) W1 drawn by a broken line schematically shows distribution of the light emitted from the polarization separation layer, and a direction L1 schematically shows the direction (an emergent direction) of the emitted light having peak intensity. The output angle of the direction L1 is called an emergent angle L1 hereinafter.

The S polarized light emitted from the polarization separation layer 10 passes the air layer 30 and enters the angle improvement layer 20. The light refracted and scattered in the angle improvement layer 20 is widened toward the ED direction and externally drawn out through the light emission side (LS) of the angle improvement layer 20.

In FIG. 4, a fan-shape (an arc) W2 marked with a broken line schematically shows distribution of the light emitted from the angle improvement layer 20, and herein, a direction L2 schematically shows the direction of the emitted light having peak intensity (an emergent direction). The emergent angle of the direction L2 is called an emergent angle α2.

Comparing the fan-shape W1 with the fan-shape W2 and the direction L1 with the direction L2, the angle improvement layer 20 brings the following two effects.

First of all, the angle improvement layer 20 makes the peak intensity direction of the light emitted from the polarization separation layer 10 close to the ED direction (an emergent angle of 0°.

Secondly, the angle improvement layer 20 widens the width (area) of the light emitted from the polarization separation layer 10.

In other words, the angle improvement layer 20 with the air layer disposed below may direct the light emitted from the light emission side (LS) toward the ED direction, widens the width of the light, and efficiently makes use of the S polarized light compared with no presence of the angle improvement layer 20.

Accordingly, when the planar light apparatus 1 is used as a backlight unit for a liquid crystal display, the planar light apparatus 1 may increase front luminance and thus decrease power consumption, and simultaneously enlarge the viewing angle while preventing a sharp change in the luminance due to the viewing angle.

EXAMPLES

For planar light apparatus 1 manufactured by changing a material of a second fiber 24 in the angle improvement layer 20 according to a plurality of examples, the emergent angle α2 and width of light (hereinafter referred to as an angular distribution of light emission) from the light emission side (LS) are illustrated.

For the material of the second fiber 24, polyethylene terephthalate (PET) is used in Example 1, polyethylene naphthalate (PEN) is used in Example 2, and nylon 6,10 is used in Example 3.

For a planar light apparatus using no angle improvement layer 20 (light emission from a polarization separation layer 10) and a planar light apparatus using a prism film instead of the angle improvement layer 20 according to comparative examples, angular distribution of light emission is measured.

FIG. 5 contains a table showing optical properties of a fiber used in each example.

In FIG. 5, the ordinary ray refractive index no and the extraordinary ray refractive index ne of each fiber are refractive indices measured using an Abbe refractometer and an intermediate solution or a compensator method using a polarization microscope.

The polarization separation layer 10 is formed by using a PET fiber having a fiber diameter of 22 μm and 24 filaments as the first fiber 14. The first fiber 14 is arranged in a length direction of D1 on a 6 cm×9 cm PMMA light guide layer. The first fiber 14 is disposed parallel to a light source 80, and the density of the first fiber 14 changes from low, to high, and to low, as the distance from the light source 80 becomes farther away increases. Then, a UV curable resin designed to have a refractive index of 1.530 after curing (a refractive index of nm1 of a first matrix layer 12) is permeated into the first fiber.

The first fiber 14 and the UV curable resin are covered with a release-treated glass plate, and a vacuum defoaming treatment is performed to remove air between the first fiber 14 and the first matrix layer 12.

The resin is cured by using a UV lamp, and then the glass plate is peeled off, manufacturing a light guide layer 40 mounted with the polarization separation layer 10.

The polarization separation layer 10 and the light guide layer 40 are used in all the examples. The polarization separation layer 10 is 350 μm thick.

Example 1

In Example 1, a PET fiber having a fiber diameter of 22 μm and 24 filaments is used as a second fiber 24. The second fiber 24 is arranged in the same direction as D1 with no gap on a release-treated glass plate.

Then, a UV curable resin designed to have a refractive index of 1.530 (a refractive index of nm2 of a second matrix layer 22) is permeated into the second fiber. The second fiber and the UV curable resin are covered with a release-treated glass plate, and a vacuum defoaming treatment is performed to remove air between the second fiber 24 and the second matrix layer 22. The UV curable resin is cured by using a UV lamp, and then the glass plate is peeled off, manufacturing an angle improvement layer 20. The angle improvement layer 20 is 150 μm thick.

The angle improvement layer 20 is disposed on the polarization separation layer 10 with an air layer 30 therebetween.

Lastly, the side of the polarization separation layer 10 and the light guide layer 30 and the bottom of the light guide layer 30 (the side of the light guide layer 30 opposite to the side where the polarization separation layer 10 is disposed) are covered with a reflector threrby manufacturing the planar light apparatus 1.

Example 2

In Example 2, a PEN fiber having a fiber diameter of 19 μm and 24 filaments is used as a second fiber 24.

The other constitutions of Example 2 are the same as those of Example 1.

Example 3

In Example 3, nylon 6,10 having a fiber diameter of 26 μm and 24 filaments is used as a second fiber 24.

The other constitutions of Example 3 are the same as those of Example 1.

[Angular Distribution of Light Emission]

Figure 6:
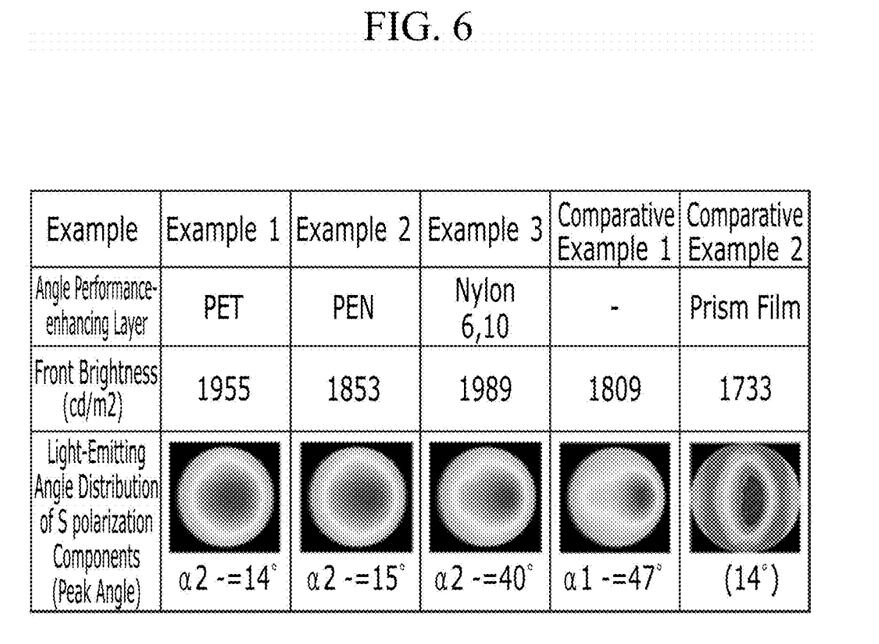
FIG. 6 shows angular distribution of light emission of planar light apparatuses in each example.

FIG. 6 shows angular distribution of light emission of each planar light apparatus 1 according to each example.

The angular distribution of light emission of an S polarization component at the bottom row of FIG. 6 shows that the higher the luminance is, the closer it is to black when right and left of a circle correspond to a direction D2, top and bottom of the circle correspond to a direction D1, and the circumference of the circle is an emergent angle of 90°. In addition, an angle in the same row indicates a peak intensity and corresponds to an emergent angle α2 in Examples 1 to 3. On the other hand, the angle corresponds to an emergent angle α1 in Comparative Example 1. In addition, frontal luminance is luminance measured from an ED direction, that is, a result measured from the center of the circle. According to Comparative Example 1 using no angle improvement layer 20, an emergent angle α1 is 47°.

In Examples 1 to 3, the emergent angle α2 of an S polarization component is close to an ED direction (an emergent angle 0°, and also becomes wider toward the light source 80 and shows overall front-facing angular distribution of light emission.

Accordingly, the front luminance is not only about 2% to about 10% improved, but the viewing angle is also widened.

On the other hand, Comparative Example 2 using a prism film shows an emergent angle facing front but an angle emitting almost no light (a side band). Accordingly, Comparative Example 2 has a problem that the viewing angle becomes narrow. In addition, Comparative Example 2 has another problem that front luminance of the S polarization is deteriorated even though the prism reduces polarization, and the emergent angle faces front.

The angle improvement layer 20 using a fiber shows no phenomenon of the prism film and is appropriately applied to a display device.

In this way, the planar light apparatus 1 according to the first embodiment may improve utilization efficiency of light, since the angle improvement layer 20 is interposed between the polarization separation layer 10 and the air layer 30 and controls angle distribution of the light toward a front direction.

The planar light apparatus 1 is used as a backlight for a liquid crystal display (LCD) to manufacture a display having low power consumption and high and uniform luminance.

<Second Embodiment>

According to a second embodiment, a planar light apparatus is manufactured by disposing a second fiber 24 to have a density that is changed depending on a distance from a light source 80, unlike the planar light apparatus of the first embodiment manufactured by disposing the first fiber 14 to have density that is changed depending on a distance from a light source 80 but the second fiber 24 having no density change.

Figure 7:
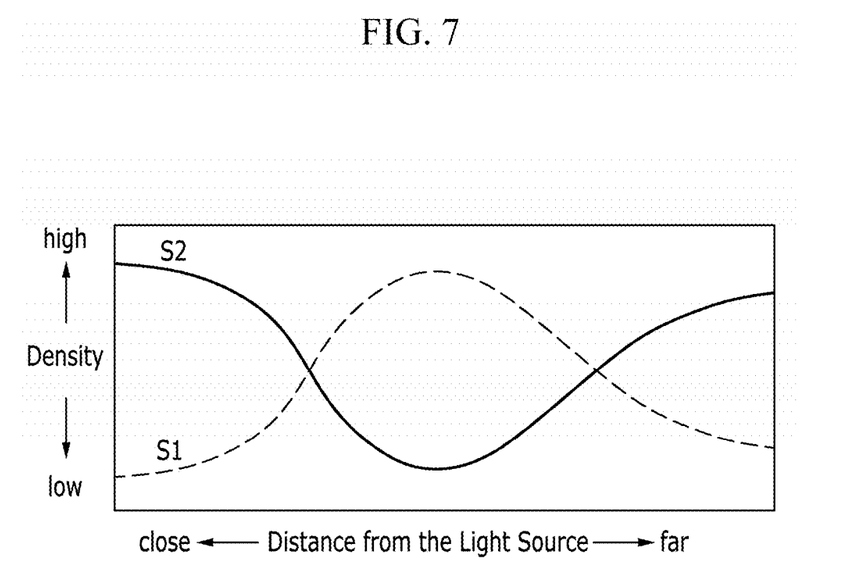
FIG. 7 shows a correlation between density distributions of a first fiber of a polarization separation layer and of a second fiber of an angle improvement layer according to a second embodiment.

FIG. 7 shows a correlation between density distributions of the first fiber 14 in a polarization separation layer 10 and the second fiber 24 in an angle improvement layer 20 according to the second embodiment. In FIG. 7, the vertical axis indicates density, and the horizontal axis indicates a distance from a light source 80.

As illustrated in the first embodiment, the disposition density of the first fiber 14 changes from low, to high, and to low in order moving farther from the light source 80 as shown in a spectrum S1.

The disposition density of the second fiber 24 in the second embodiment changes from high, to low, and to high moving farther from the light source 80 as shown in a spectrum S2. In other words, the disposition density of the first fiber 14 has an inversion relationship with the disposition density of the second fiber 24 in the second embodiment.

When the disposition density of the first fiber 14 in the polarization separation layer 10 depending on the size of the light guide layer 40, the radiation range of light from the light source 80, the composition of the polarization separation layer 10, and the like, is provided as shown in FIG. 7, the amount of S polarization light emitted into the air layer 30 does not change depending on a distance from the light source 80, while the width (angle) as a fan-shape W1 changes depending on a distance from the light source 80. For example, the higher the arrangement density of the first fiber 14 is, the larger the light angle is, while the lower the arrangement density is, the smaller the light angle is.

Even in this case, a light width (angle) may be constant regardless of a distance from the light source 80 by adjusting the arrangement density distribution of the second fiber 24 in the angle improvement layer 20 to have a correlation with the first fiber 14 as shown FIG. 7.

<Third Embodiment>

A third embodiment provides a display device such as a liquid crystal display and the like manufactured by applying the planar light apparatus 1.

Figure 8:
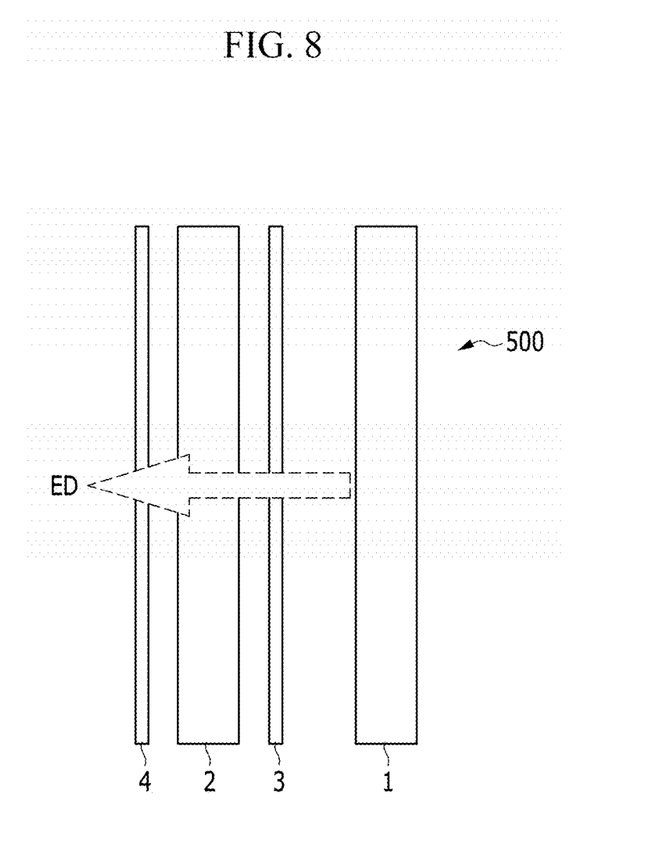
FIG. 8 shows a structure of a display device according to a third embodiment.

FIG. 8 shows a display device 500 according to the third embodiment.

The display device 500 includes a liquid crystal panel 2, polarizers 3 and 4, and the planar light apparatus 1 emitting light toward them.

The polarizer 3 is set in an axis so that it may pass S polarized light drawn from the planar light apparatus 1 toward an ED direction.

The liquid crystal panel 2 includes a liquid crystal driving circuit mounted in a plurality of pixels and a liquid crystal controlling rotation of light transmitted by the liquid crystal driving circuit in a polarization direction.

The polarizer 4 is set in an axis so that it may pass a light that rotates by 90° relative to the light passing through the polarizer 3. On the other hand, since light from the planar light apparatus 1 is collected in a polarization direction, the polarizer 3 at the side of the planar light apparatus 1 of the liquid crystal panel 2 is not necessary.

The display device 500 may be applied to a smart phone, a mobile phone, a PC, a TV, and the like.

<Exemplary Variation 1>

In the above embodiments, the length direction D1 of the first fiber 14 and the second fiber 24 is perpendicular with a direction D2.

The length direction D1 of the first fiber 14 is not necessarily perpendicular with the direction D2, and may be different from the direction D2. The angle of the direction D1 with the direction D2 may be, for example, in a range of greater than or equal to about 70° to less than or equal to about 90°, and specifically, greater than or equal to about 80° to less than or equal to about 90°. The angular range may have little influence on front luminance and angular distribution of light emission (compared with about 10% when the two directions are perpendicular).

In addition, the first fiber 14 and the second fiber 24 are arranged in the same length direction as aforementioned but not in the same direction depending on a desired angular distribution of light emission from a light emission side (LS).

In other words, the length direction of the second fiber 24, like the length direction of the first fiber 14, may not necessarily be perpendicular with the direction D2 but may be different from the direction D2. The angle with the direction D2 may be, for example, in a range of greater than or equal to about 70° to less than or equal to about 90°. The angle range has little influence on front luminance and angular distribution of light emission (compared with about 10% when the two directions are perpendicular).

<Exemplary Variation 2>

In the aforementioned embodiments, the refractive index nm1 of the first matrix layer 12 of the polarization separation layer 10 conforms with the ordinary ray refractive index no1 of the first fiber 14, but may conform with the extraordinary ray refractive index ne1 of the first fiber 14. In this case, a P polarization component rather than the S polarization is drawn out into the air layer 30.

Likewise, the refractive index nm2 of the second matrix layer 22 may conform with the extraordinary ray refractive index ne2 of the second fiber 24 in the angle improvement layer 20.

<Exemplary Variation 3>

In the aforementioned embodiments, the air layer 30 is present between the polarization separation layer 10 and the angle improvement layer 20, but any layer having a lower refractive index than the refractive index nm1 of the first matrix layer 12 in the polarization separation layer 10 (a low refractive index layer) may be disposed instead of the air layer 30. When this low refractive index layer is disposed between the polarization separation layer 10 and the angle improvement layer 20, total reflection of light not supposed to be drawn out from the polarization separation layer 10 (the P polarization component) is maintained.

The low refractive index layer may have a refractive index of, for example, less than or equal to about nm1-0.2, less than or equal to about nm1-0.3, and infinitely close to 1 depending on light radiation from the light source 80, thickness of the light guide layer 40, and the like. In this view, the low refractive index layer may consist of gas like the air layer 30.

<Exemplary Variation 4>

In the aforementioned embodiments, the first fiber 14 and the second fiber 24 may have a circular cross-section, but it is not limited thereto. For example, the cross-section may be a regular or irregular polygon such as a triangle, a rectangle, a hexagon, and the like, or a shape formed by combining a curved line and a straight line.

In addition, the first fiber 14 and the second fiber 24 may have a mixed length of long and short ones and do not need to have both ends of the direction D1 continuously connected. Furthermore, a layer stacked in a thickness direction may be adjusted depending on optical properties.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

1 . . . planar light apparatus, 2 . . . liquid crystal panel, 3, 4 . . . polarizer, 10 . . . polarization separation layer, 12 . . . first matrix layer, 14 . . . first fiber, 20 . . . angle improvement layer, 22 . . . second matrix layer, 24 . . . second fiber, 30 . . . air layer, 40 . . . light guide layer, 40S . . . light incidence side, 50 . . . lower reflector, 60 . . . side reflector, 80 . . . light source, 100 . . . light guide plate, 500 . . . display device

What is claimed is:

1. A light guide plate emitting light radiated from a light source disposed at a side thereof through a light emission side, the light guide plate comprising:

a light guide layer having a light incidence side for introducing light emitted from the light source into the light guide layer;

a polarization separation layer comprising a first matrix layer having an isotropic refractive index of nm1 and a first fiber having birefringence, with an ordinary ray refractive index, no1 and an extraordinary ray refractive index, ne1; where the extraordinary ray refractive index is measured parallel to the length direction of the fiber and the ordinary ray refractive index is measured perpendicular to the length direction of the fiber; where the polarization separation layer are disposed in the light guide plate closer to the light emission side than the light guide layer; where the first fiber is continuous from one face of the polarization separation layer to an opposing face of the polarization separation layer;

a low refractive index layer having a lower refractive index than the refractive index of the first matrix layer and disposed more toward the light emission side than the polarization separation layer; and an angle improvement layer comprising a second matrix layer having an isotropic refractive index of nm2 and a second fiber disposed inside the second matrix layer and having birefringence, with an ordinary ray refractive index, no2, an extraordinary ray refractive index ne2, where the extraordinary ray refractive index is measured parallel to the length direction of the fiber and the ordinary ray refractive index is measured perpendicular to the length direction of the fiber; and where the angle improvement layer is disposed more toward the light emission side than the low refractive index layer, and wherein the first matrix layer and second matrix layer comprise a resin having the same composition, and the first fiber and the second fiber comprise a resin having the same composition;

wherein the first matrix layer, the second matrix layer, the first fiber, and the second fiber have a refractive index in a range of $|nm1-no1|\leq 0.01$ and $|nm2-no2|\leq 0.01$, or $|nm1-ne1|\leq 0.01$ and $|nm2-ne2|\leq 0.01$.

2. The light guide plate of claim 1, wherein the low refractive index layer is a gas layer.

3. The light guide plate of claim 1, wherein the second fiber is disposed in the same major-axis direction as major-axis direction of the first fiber.

4. The light guide plate of claim 1, wherein a reflector rotating light polarization and reflecting the light is mounted on at least one side of neither the light incidence side of the light guide layer nor the light emission side.

5. The light guide plate of claim 1, wherein the first fiber has changing disposition density depending on a distance from the light incidence side, and the disposition density of the second fiber has an inverse relationship with the disposition density of the first fiber.

6. A planar light apparatus comprising:
the light guide plate of claim 1; and
a light source disposed at the light guide plate.

7. A display device comprising:
the planar light apparatus of claim 6;
a liquid crystal panel receiving light emitted from a light emission side and controlling rotation of the light in a polarization direction; and
a polarizer mounted on the opposite side of the planar light apparatus with reference to the liquid crystal panel.

* * * * *